United States Patent [19]
Hu et al.

[11] Patent Number: 5,946,110
[45] Date of Patent: Aug. 31, 1999

[54] APPARATUS FOR MULTIPLE RESOLUTION SCANNING

[75] Inventors: Darwin Hu, San Jose; Lawrence Huang, Fremont, both of Calif.

[73] Assignee: Microtek Artix Corporation, San Jose, Calif.

[21] Appl. No.: 08/858,726

[22] Filed: May 19, 1997

[51] Int. Cl.[6] .................................................. H04N 1/04
[52] U.S. Cl. .......................................... 358/474; 358/494
[58] Field of Search ..................................... 358/496, 497, 358/474, 488, 408, 498, 401, 486; 399/379; 250/234, 235, 236; 355/75

[56] References Cited

U.S. PATENT DOCUMENTS

| | | | |
|---|---|---|---|
| 5,140,443 | 8/1992 | Iwahara et al. | 358/401 |
| 5,239,392 | 8/1993 | Suzuki et al. | 358/474 |

*Primary Examiner*—Edward L. Coles
*Assistant Examiner*—Cheukfan Lee

*Attorney, Agent, or Firm*—Roy W. Latham; Douglas M. Clarkson

[57] ABSTRACT

A mechanical, electrical and optical scanning apparatus for producing a digital image of a two-dimensional original object in which the combined motions of multiple platforms or carriages along one dimension of the two-dimensional original object provides both low resolution scan of the original object and high resolution scan of the original object as well as intermediate resolutions. One of the platforms carries a camera with precision zoom/focus control for receiving light energy from said original object along the other of its dimensions converting it into electrical energy in a digital format. This platform provides low resolution scanning. The other platform carries the original object and provides high resolution scanning but moves only a fraction of the length of the original object. Combined motion of the two platforms provides high resolution scanning along the entire length of the two-dimensional original object.

11 Claims, 5 Drawing Sheets

APPARATUS FOR MULTIPLE RESOLUTION SCANNING

FIELD OF THE INVENTION

The present invention, generally, relates to digital scanner apparatus and, more particularly, to a new and improved digital scanner for professional printing and publishing in the graphics arts industry.

The apparatus according to the present invention scans a piece of two-dimensional artwork, graphics or textual material and produces a corresponding computer image. The computer image is composed of a series of computer picture elements, or pixels, which can be processed to produce many desirable products, including a two-dimensional reproduction of the original object.

More particularly, the present invention relates to a scanning apparatus with more than one moving platform. The moving platforms carry the original object to be scanned as well as the electronic and optical devices necessary for generating the computer image.

The multiplicity of moving platforms allows a single apparatus to produce scanned images in a multiplicity of production modes. The production modes range from a low resolution mode for high productivity and maximum data throughput to a high resolution mode for maximum pixel resolution and best image quality in the final product.

BACKGROUND OF THE INVENTION

The ultimate quality of any scanned image is generally limited by the ability of the scanner to resolve minute features in the original object being scanned. A computer image from a scanner contains a large number of computer picture elements, or pixels. The more pixels per unit area in the image, the better its resolution and overall image quality.

High resolution scanning provides faithful reproduction of graphic art material. High resolutions mandate tight production tolerances for critical scanner parameters such as the object-to-image distance (optical focus), the speed and linearity of moving platform and the color accuracy.

Moreover, high resolution scanning is particularly useful when scanning small original objects, such as a frame of 35 millimeter film. Beginning with a resolution of 4000 pixels per inch for a single frame of 35 millimeter film, a relatively high resolution of 500 pixels per inch is maintained when the frame is enlarged to an 8 by 10 inch size of a typical personal computer screen.

Scanners available today are capable of producing images at a single resolution. In other words, today's scanners usually are a compromise between scanning speed and pixel resolution. A scanner today with low pixel resolution can convert an original object to a computer image rapidly, and a scanner with high pixel resolution can convert the same original object but more slowly.

An apparatus for multiple resolution scanning is described in detail hereinafter. An apparatus according to the present invention has a main support, a fine carriage assembly, a main carriage assembly and a camera box assembly.

The fine carriage carries the original object to be scanned. The main carriage carries the camera box which forms the scanned image. The main support also encloses an electronics box which contains circuitry used to control the apparatus and to interface the scanned output image to a host computer.

The scanner is fabricated with heavy-duty, generally expensive materials required by the low-tolerance, high-precision scanning requirements. An outer cover encloses the entire apparatus.

To produce a scanned image, the scanner according to the present invention converts analog light signals to digital pixels along a single fine line across the image in, for instance, the width dimension. This single line across the image is known as a scan line. Many scan lines are built up in, for instance, the length dimension, to form the image.

Scanner resolution capability is measured in pixels per inch, or ppi. The length dimension, in inches, is measured along a single scan line. Typical, scanning resolution for a personal computer application mentioned above is approximately 72 pixels per inch, figured as follows.

Assume that the personal computer screen measures 10 inches in width. The computer hardware produces a scan line of 720 pixels that runs across the 10 inch width. The resulting resolution is 720/10=72 pixels per inch. An arrangement according to the present invention supports resolutions of 667, 1,000, 2,000, 3,000 and 4,000 pixels per inch.

In order to achieve extremely high scanning resolutions of up to 4000 pixels per inch, the object-to-image distance must be precisely controlled to maintain optical focus. That is, a scan line on the original object and the corresponding scan line on the electro-optical imaging device must remain parallel to each other within 9 microns at all times during the scanning operation.

An apparatus according to the present invention, as described in detail hereinafter, contains a unique arrangement of lead screws, pulleys and shafts that control camera box positioning within a 9 micron tolerance for object-to-image distance. Only with such tight tolerances is high resolution scanning possible.

Further, the camera box of the disclosed invention contains a number of individual lenses mounted in a turret assembly. Each lens provides a single scanning resolution.

When a user selects a particular resolution for scanning, the turret assembly moves to place the correct lens between the original object and the electro-optical imaging device. Precision bearings and overall construction of the multi-lens turret assembly also achieves the 9 micron tolerance requirement for object-to-image distance.

The selected lens focuses the light energy from the original object onto a Charge Coupled Device, or CCD. The CCD is a device for converting optical signals into computer pixels at high ppi resolutions. It is a linear array of photodetectors accessed like a shift register with voltage output proportional to light level.

In this case, the CCD has 8,000 triads of photodetectors along its 72 centimeter length, giving the CCD an intrinsic resolution of 2,822 ppi in full red, green, blue (RGB) color. The lenses convert the intrinsic 2,822 ppi CCD resolution to the multiple scanner resolutions of 667, 1,000, 2,000, 3,000 and 4,000 ppi.

In the current invention, combined translational motions from multiple transport platforms produce multiple speed and resolution capabilities. The main carriage uses a stepping motor and timing belt to transport the original object over an 18 inch maximum length to produce low resolution, high speed scans.

The fine carriage uses a precision ball screw mechanism to transport the same original object to produce high resolution, low speed scans. A unique, complementary indexed motion of main and fine carriages supports high resolution scanning over the entire original object.

The fine carriage is not in motion during low resolution scanning. Instead, the main carriage moves the camera box along the entire length of the original object to rapidly form a low resolution scanned image. The original object can be up to 18 inches in length. The main carriage, therefore, translates up to 18 inches in the direction of scan to produce the low resolution output.

The high resolution translation of the fine carriage is limited to approximately 5 inches. This limitation is due to a generally expensive, high precision, zero backlash ball screw which itself is approximately 5 inches in length.

Even though the translational motion of the fine carriage is limited to approximately 5 inches, an entire 18 inch object can be scanned at high resolution. This is accomplished by a complementary, indexed motion of the two carriages, as follows.

First, the fine carriage scans the initial 5 inches of the original 18 inch object by moving it over the camera box on the stationary main carriage.

Second, the main carriage indexes 5 inches along the original object by moving the camera box in the direction of scan.

Third, while the main carriage is indexing, the fine carriage returns to its starting position by moving opposite to the direction of scan. This positions the camera box at the precise location where the scanning left off, but with the fine carriage at its starting point instead of its stopping point.

Fourth, the fine carriage scans the next 5 inches of the original 18 inch object. This process repeats until the entire 18 inch object is scanned at high resolution.

Thus, the present invention describes a unique apparatus which scans long objects at high resolutions using a relatively short precision ball screw drive mechanism.

One modification for a high precision scanner could use a single carriage instead of the multiple carriages described herein. The short 5 inch lead screw in the dual carriage design is replaced by a long 18 inch lead screw in the single carriage design.

Such a long lead screw is required to cover the entire 18 inch scanning area. The single carriage design is unsatisfactory for two reasons.

First, a precision, zero-backlash ball screw is an expensive item with cost proportional to length. An 18 inch precision ball screw would be prohibitively expensive.

Second, the 9 micron depth-of-focus requirement mandates closely spaced re-calibrations of the object-to-image distance during the scanning operation along the entire length of scan. This depth-of-focus (i.e., vertical) calibration is easier to implement using a short 5 inch lead screw, compared with a long 18 inch lead screw.

In the preferred embodiment, both main and fine carriages are driven by stepping motors. One step of the main carriage stepping motor corresponds to 1/2000 inch translation. One step of the fine carriage stepping motor corresponds to 1/12,000 inch translation.

The main carriage translates over the full 18 inch maximum size of the original. The fine carriage translates over the distance of approximately 5 inches allowed by a precision, no-backlash ball screw.

Precision stops along the main carriage provide index points at which the 5 inch fine carriage translation can be reset and a high resolution scan continued over the full 18 inch maximum dimension. The stops along the main carriage are accurate to 2.77 percent of one step of the main carriage, or better than 1/40,000 inch.

The scanner apparatus of the present invention can handle a variety of original objects including 12×18 inch, 8×10 inch, 4×5 inch, 60 mm×60 mm and 35 mm transparent film. The maximum width which can be scanned depends on the scan resolution selected.

At low resolution of 667 ppi, the maximum width scanned corresponds to the full width of the carriage, or 12 inches. At higher resolutions, the maximum width decreases as resolution increases to a limit of about 2 inches maximum width at 4000 ppi resolution.

The present invention embodies the benefits of both high speed and high resolution in a single scanning apparatus. Therefore, an original object can be scanned at high speed and low resolution to produce a preview, or working, image.

Also, according to the present invention, an original object can be scanned at low speed and high resolution to produce a final high quality image. This multiplicity of speeds and resolutions is available without tear-down and set-up of the original object that is being scanned.

OBJECTS AND SUMMARY OF THE INVENTION

Accordingly, it is an object of the present invention to provide an apparatus that can produce scanned images at extremely high pixel resolutions.

An additional object of the present invention is to provide an apparatus adaptable for multiple scanning resolutions.

Another object of the present invention to provide an apparatus that can produce scanned images at more than one resolution.

Yet another object of the present invention is to provide an apparatus that supports selectable resolutions for an output image.

Still another object of the present invention is to provide an apparatus that can produce multiple resolution outputs of an object without tear-down and set-up for each resolution produced.

Briefly, a scanning apparatus according to the present invention produces a digital image of a two dimensional original object by combining the motion of two platforms along one dimension of the object to provide both high and low resolution scans at high and low speeds.

DETAILED DESCRIPTION OF THE INVENTION

Figure 1:
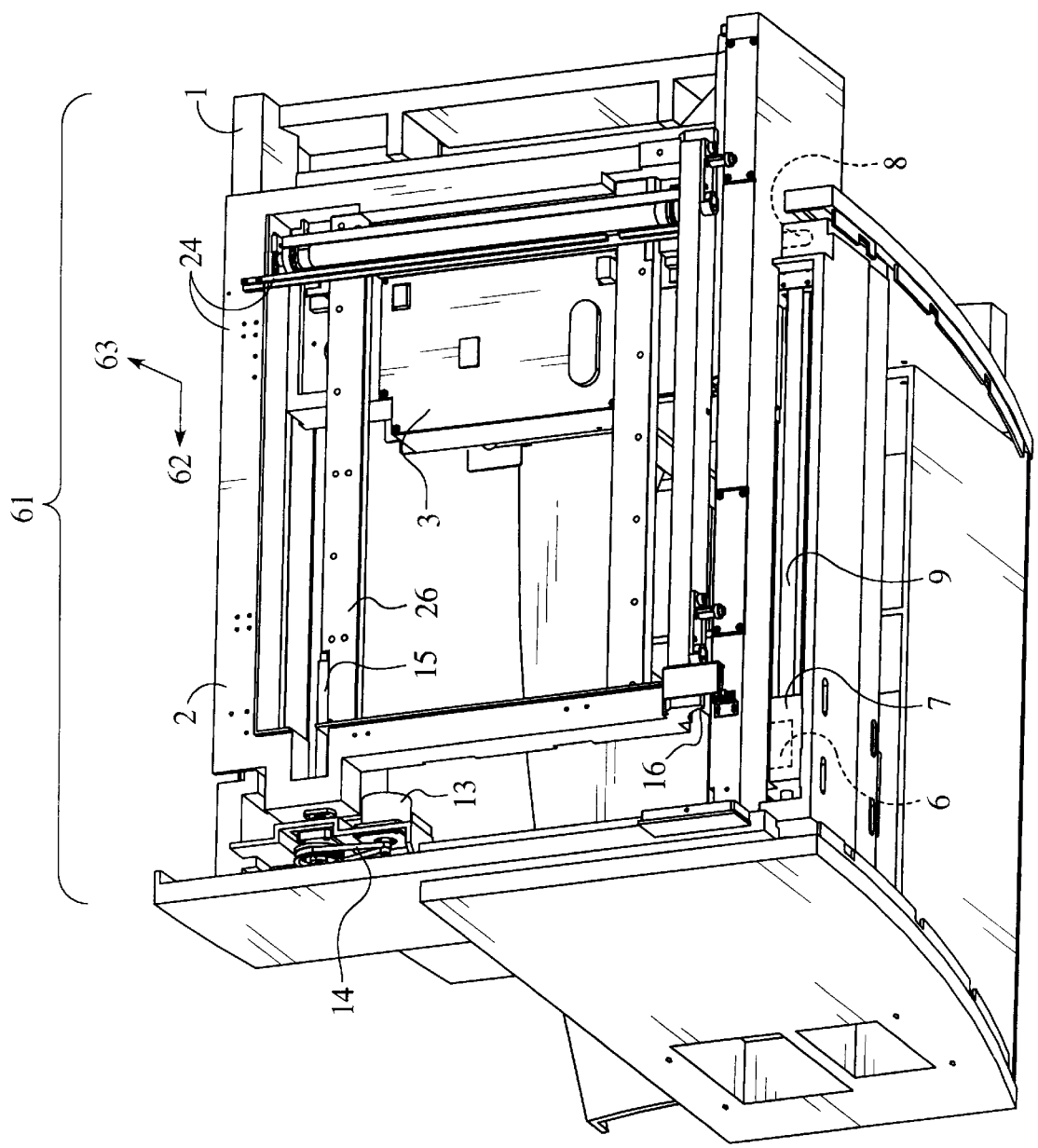
FIG. 1 shows a perspective top view of the preferred embodiment looking from above and behind the unit.
Figure 2:
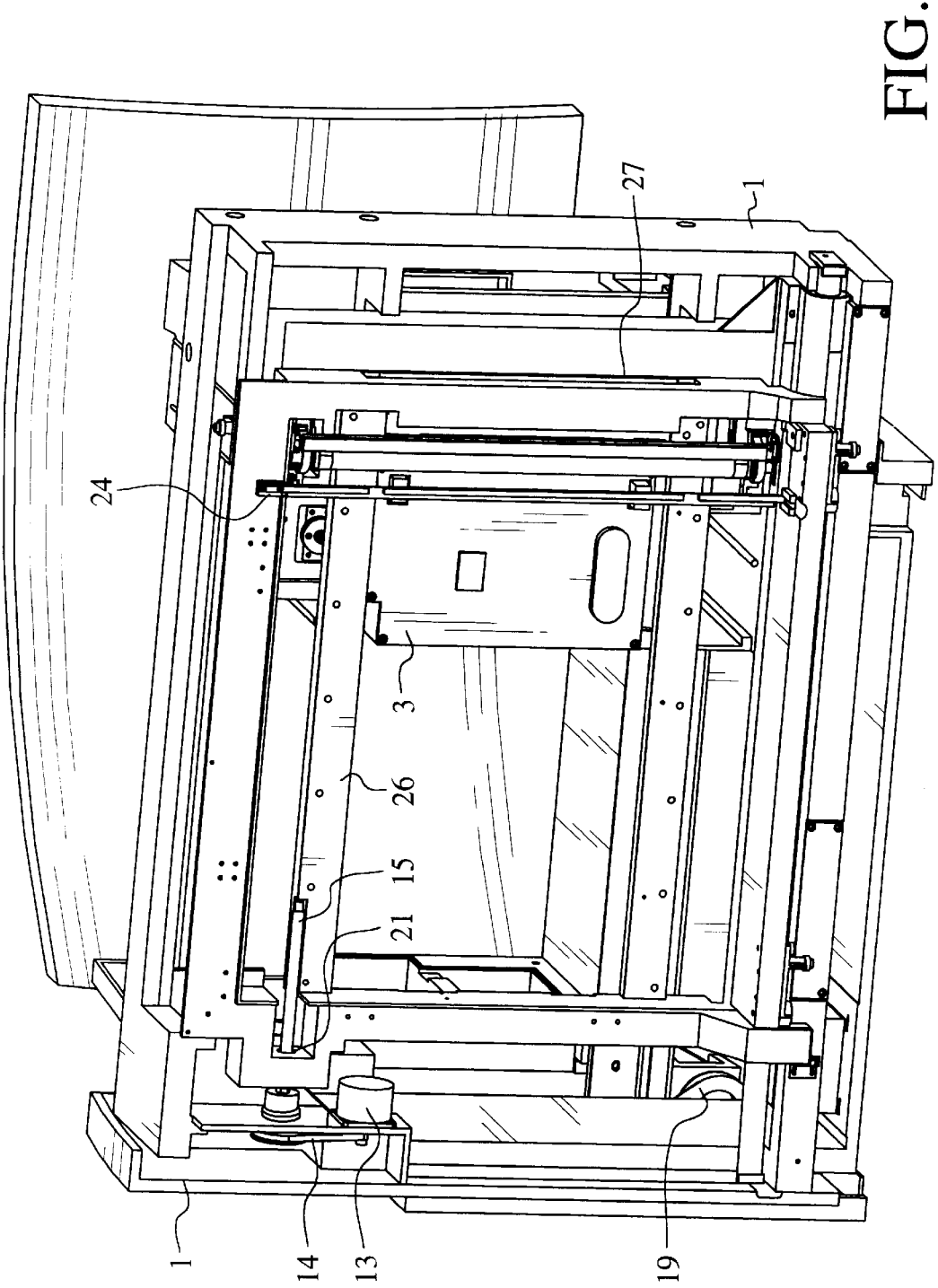
FIG. 2 shows a perspective top view of the preferred embodiment looking from above and in front of the unit.

Main Support—The main support assembly 1 rests on the floor of a room and provides a generally horizontal, vibration-free flatbed scanning area 61 by means of vibration isolators 19.

Fine Carriage—A linear slide 16 and a high precision, zero-backlash, generally horizontal ball screw 15 connects the main support assembly 1 to a fine carriage assembly 2 and provide one degree-of-freedom translational motion in the generally horizontal scanning direction 62.

The original object to be scanned rides on the object glass 23 which is connected to the fine carriage assembly 2. For high resolution scanning, a fine carriage stepping motor 13 and timing belt 14 turn the ball screw 15 which, in turn, moves the fine carriage assembly 2 by means of a ball screw bushing 21.

Figure 3:
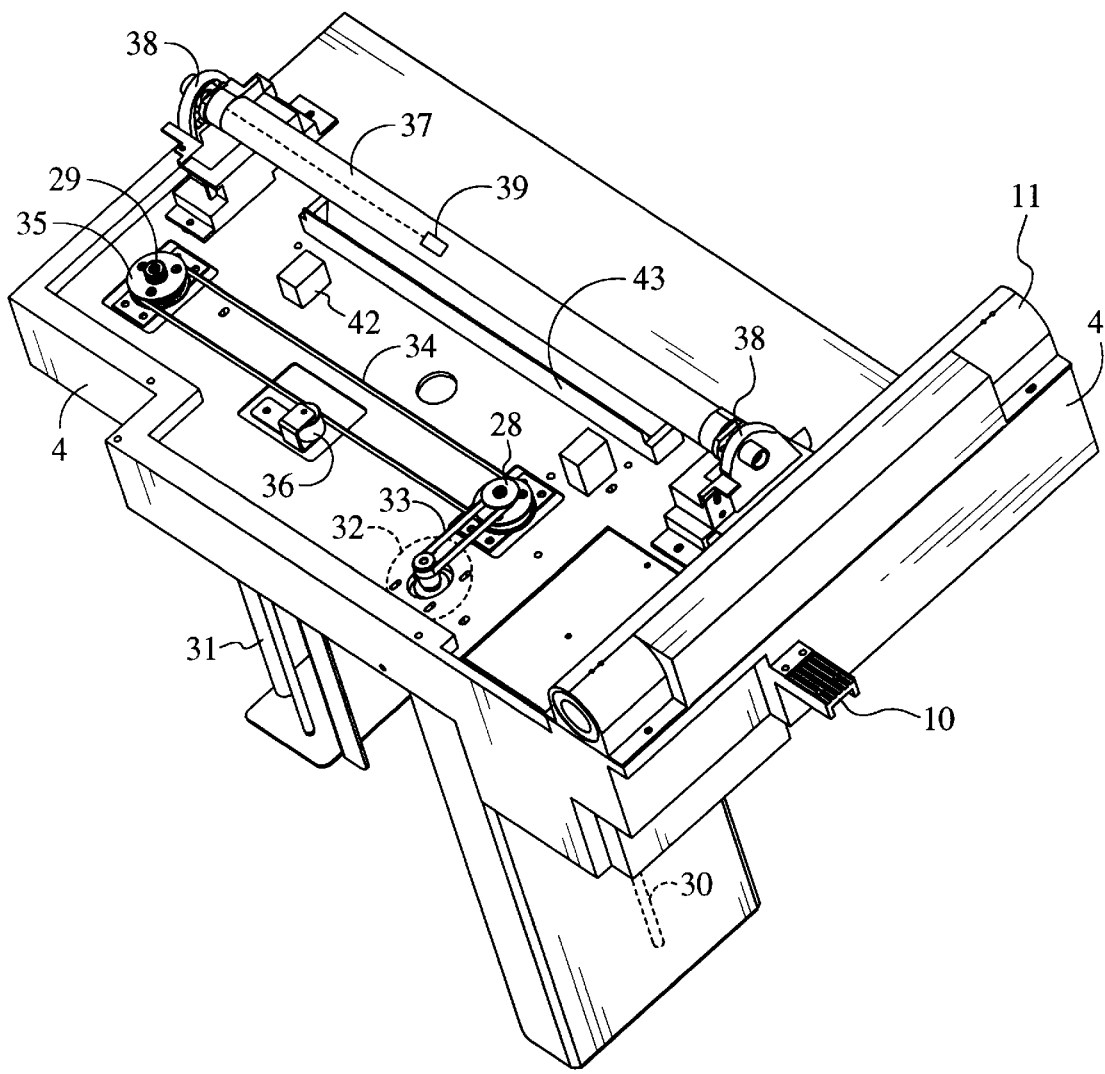
FIG. 3 shows a perspective view of the main carriage.
Figure 4:
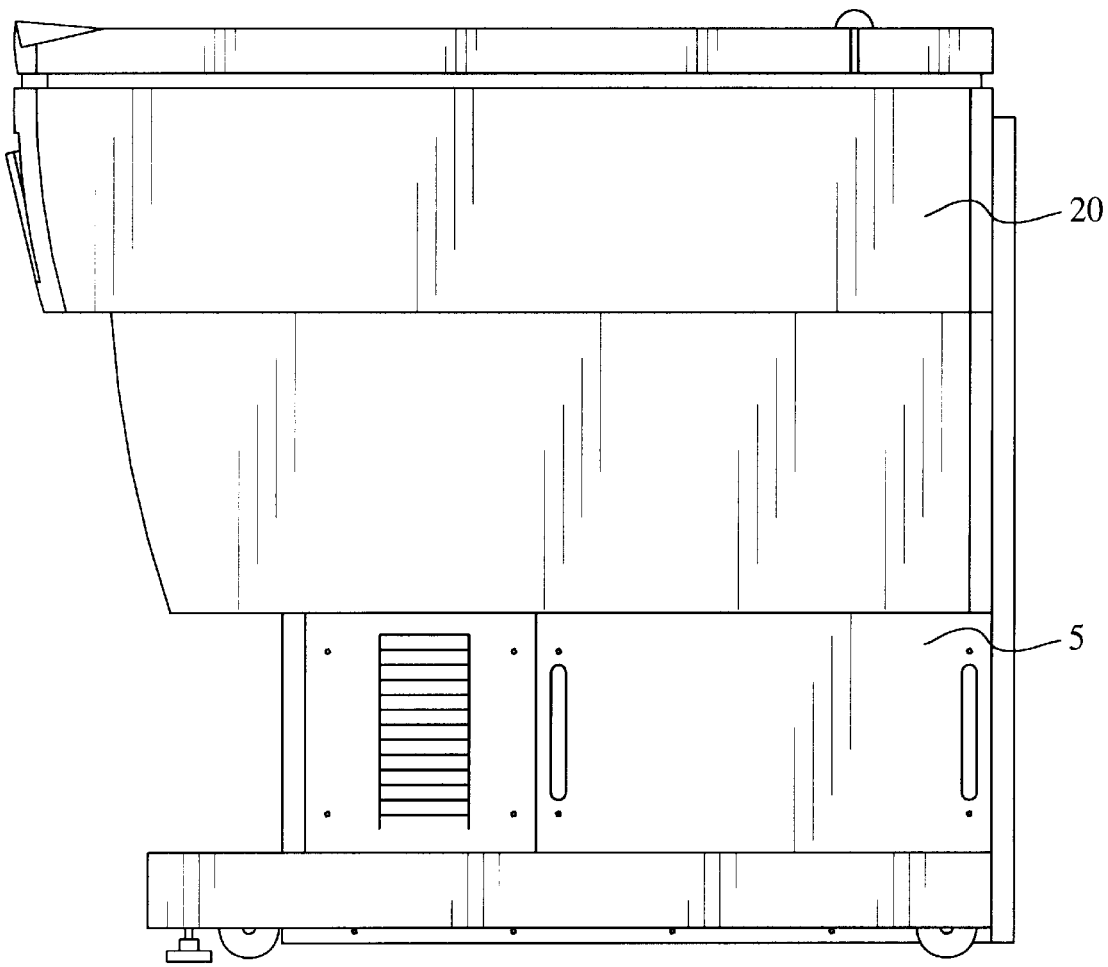
FIG. 4 shows the right side view.
Figure 5:
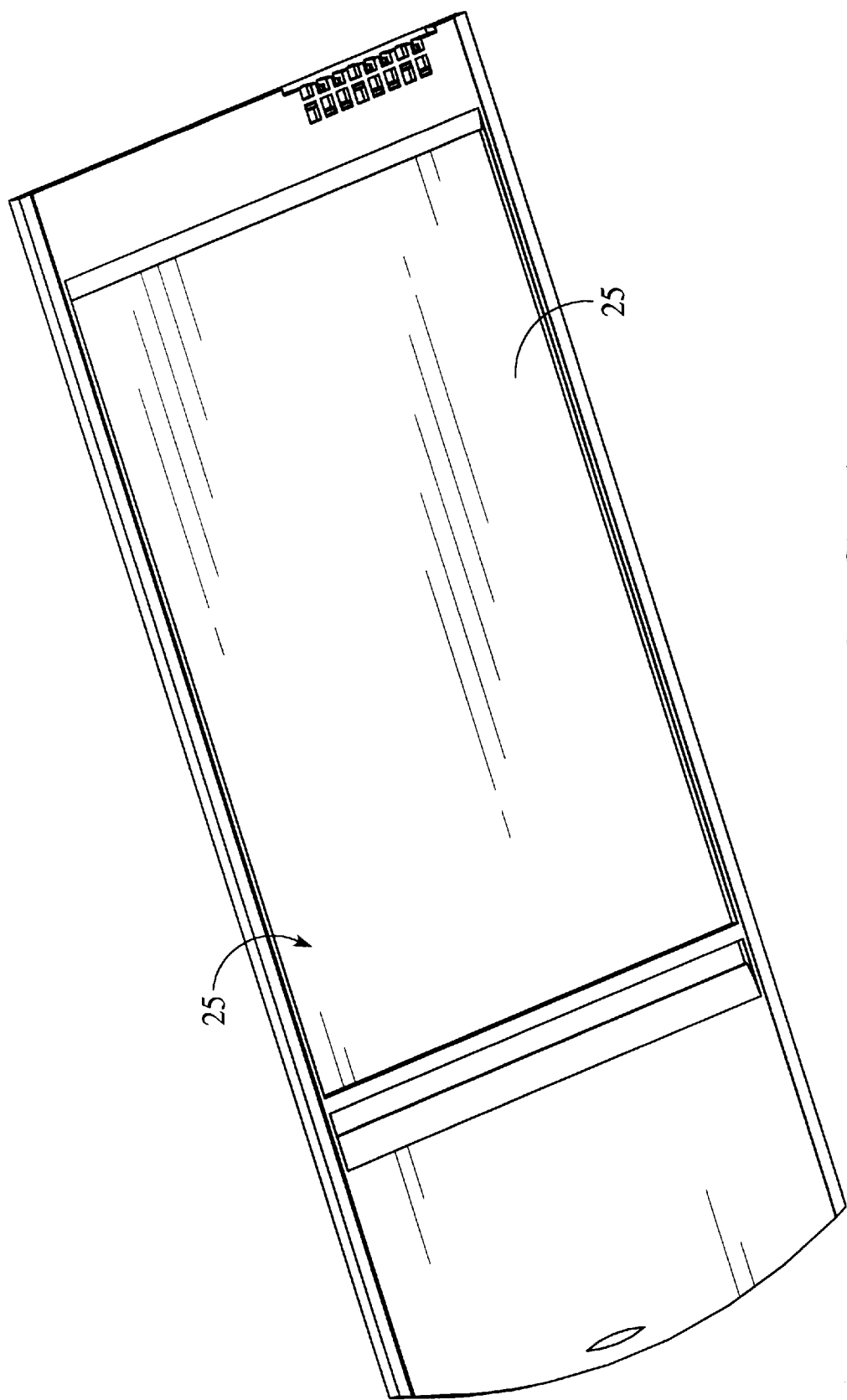
FIG. 5 is a perspective view of a component of the invention.

The fine carriage assembly 2 transports the original object past a fluorescent lamp 37 (FIG. 3) and optical equipment in a camera box assembly 4 (FIG. 3) to form the scanned output image. Translation of the fine carriage assembly 2 is very precise, with one step of the stepping motor 13 corresponding to $\frac{1}{12,000}$ inch movement in the direction of scan 62.

Length of travel for the ball screw 15 is approximately 5 inches, allowing the fine carriage assembly 2 to travel roughly that distance during scanning operation. There is a home sensor 17 which senses when the fine carriage assembly 2 has reached its initial starting position.

Further, a triangular shaped, start-of-scan, marker 18 allows precision, repeatable control of the start of each scanning operation. In addition to the original object to be scanned, there is a calibration strip 22 outside the view area of an object glass 23. In calibration mode, the apparatus scans the calibration strip 22 to initialize internal focus, alignment and color settings.

Main Carriage—As stated, the fine carriage assembly 2 provides low-speed, high-resolution scanning. Conversely, the main carriage assembly 3 (FIG. 1) provides high-speed, low-resolution scanning.

The main carriage assembly 3 is connected to the main support 1 by means of a linear slide 11 (FIG. 3) which provides one degree-of-freedom motion in the direction of scan 62. A main carriage stepping motor 6, gear box 7, idler pulley 8, timing belt 9 and timing belt rack 10 drive the main carriage through the full 18 inch maximum dimension, so that the entire original object may be scanned, plus the additional distance necessary to scan the calibration strip 22.

There is also a home sensor 12 for the main carriage assembly 3 which senses when it has reached its initial starting position, and a set of safety stops 42 to limit travel of the main carriage in the event of a system malfunction.

Movement of the main carriage assembly 3 is coarser than the movement of the fine carriage assembly 2. Whereas the fine carriage assembly 2 moves $\frac{1}{12,000}$ inch with each step of its stepping motor 13, the main carriage assembly 3 moves $\frac{1}{2,000}$ inch with each step of its stepping motor 6.

Precise positioning of both carriages, therefore, is obtained by counting respective steps from the start-of-scan position. However, careful attention is paid to controlling the movement of the main carriage assembly 3, so that at rest it is always positioned in increments of one full step (i.e., $\frac{1}{2,000}$ inch).

This is accomplished by a ramp-up, ramp-down control of the main carriage stepping motor 6. With the main carriage positioned precisely at a full step position, it is possible for the fine carriage assembly 2 to scan the entire image by a complementary indexing motion with the main carriage assembly 3, as described.

The main carriage assembly 3 carries the fluorescent lamp 37 with aperture as the source of light for scanning. A lamp intensity sensor 39, mounted near the lamp 37, measures the light output. Light output measurements from the lamp intensity sensor 39 indicate when the lamp is growing dim and must be changed.

Further, these same light intensity measurements are used in a firmware feedback loop to control instantaneous lamp output. Such intensity control is necessary for precision scanning, especially when the original object is in color, instead of black-and-white. The output color spectrum of the lamp 37 is controlled also by firmware to account for variations in color sensitivities. Camera Box—In addition to the lamp 37, the main carriage assembly 3 also carries the camera box assembly 4. The camera box assembly 4 contains lenses 51, control circuitry 53 and the CCD which forms the output image. It is necessary to control the distance between the original object on the object glass 23 and the CCD inside the camera box assembly 4 to within 9 microns.

Outside this tolerance optical focus is lost and, in turn, so is high resolution. Focus must be maintained along the entire length of the scan line, that is, along the length of the original object perpendicular to the scan direction 62 of the CCD 52. The required object-to-image distance is not a fixed distance but changes with the selected scanner resolution and for each individual scanner manufactured. The required object-to-image distance changes with scanning resolution because each resolution uses a different lens, and each lens is optimized for a particular object-to-image distance.

The required object-to-image distance also changes with each individual scanner manufactured, since production tolerances on the lenses vary within a few millimeters from lens to lens. Correct values for all of the required object-to-image distances are loaded into the scanner's firmware in the electronics box 5.

The variable object-to-image distances are handled on the main carriage assembly 3 by the guide lead screw 28 (FIG. 3), by idler lead screw 29, by guide shaft 30 and by idler shaft 31. This arrangement of lead screws and shafts permits the camera box assembly 4 to be moved upward and downward in the vertical zoom/focus direction 63.

One of the vertical shafts, designated the guide shaft 30, is mounted rigidly to maintain precise perpendicularity of the original object glass 23 and film transparency holder 25 and CCD to the lens turret bearing 50. The other shaft, designated the idler shaft 31, serves as an idler to prevent the camera box assembly 4 from rotating.

Similarly, one of the vertical lead screws is designated the guide lead screw 28, and its motion is coupled to the zoom/focus motor 32 by coupling pulleys 35 and a coupling timing belt 34. A timing belt tension adjuster 36 maintains proper tension on the coupling timing belt 34 between the guide lead screw 28 and the idler lead screw 29.

Vertical motion in the zoom/focus direction 63 is controlled by a zoom/focus motor 32 and a zoom/focus timing belt 33. Motion is produced by this motor 32 and transferred to the camera box assembly 4 via the guide lead screw 28 and idler lead screw 29. Vertical motion is transferred by the guide lead screw 28 to the camera by threading into a nut in the camera box assembly 4.

Likewise, the guide shaft 30 and idler shaft 31 on the main carriage assembly 3 have corresponding ball bearing guides on the camera box assembly 4. The vertical mechanisms on the main carriage 3 and camera box assembly 4 are adjustable, so that production tolerances can be cancelled to allow the camera box assembly 4 to move freely in the zoom/focus direction 63.

It is understood that the foregoing description is only illustrative of a presently preferred embodiment of the invention. Various alterations and modifications can be devised by those skilled in the art without departing from the spirit and scope of the invention which is defined by the claims appended hereto.

What is claimed is:

1. A scanning apparatus for producing a two dimensional computer image of a two dimensional original object comprising:

at least first and second platforms both supported for linear scanning motion along a predetermined path determined by at least one dimension of said original object;

said first platform carrying said original object and said second platform carrying electro-optical image reproduction means;

first and second scan motive means for moving said first and second platforms along said path;

one of said scan motive means moving one of said platforms over the entire length of said path;

the other of said scan motive means moving the other of said platforms over a fractional part of said path; and motion control means for controlling said first and second scan motive means.

2. The scanning apparatus of claim 1 wherein said motion control means includes high resolution control means for controlling said first and second scan motive means in a manner to produce high resolution scanning over the entire length of said path, low resolution motion control means for controlling second scan motive means in a manner to produce low resolution scanning over the entire length of said path, and motion selection means for controlling said first and second scan motive means to produce intermediate scanning resolutions between said high resolution scanning and said low resolution scanning.

3. The scanning apparatus of claim 1 wherein said first scan motive means includes a high resolution stepper motor and high resolution transmission means coupled to said first platform; and said second scan motive means includes a low resolution stepper motor and low resolution transmission means coupled to said second platform.

4. The scanning apparatus of claim 3 wherein said high resolution transmision means includes a non-slip belt, pulleys and precision ball screw of a length corresponding generally to said fractional part of said path; and said low resolution transmission means includes a non-slip belt.

5. The scanning apparatus of claim 1 wherein said electro-optical image reproduction means includes lamp means, camera means, and at least two lenses for focusing light from said original object.

6. A scanning apparatus for producing a two dimensional computer image of a two dimensional original object comprising:

at least first and second platforms both supported for linear scanning motion along a predetermined path determined by at least one dimension of said original object;

said first platform carrying said original object and said second platform carrying electro-optical image reproduction means;

said electo-optical image reproduction means comprises:
lamp means for producing light energy for illuminating said original object;

camera means for receiving said light energy along the other of said object dimensions and coverting it into electrical energy in digital format using a charge coupled device;

a multiplicity of lenses for focusing said light energy from said original object onto said charge coupled device;

lense selection means for selecting one of said lenses to achieve said high, low and intermediate resolutions;

zoom/focus motive means for precisely maintaining the proper distance between said original object and said charge coupled device;

first and second scan motive means for moving said first and second platforms along said path;

one of said scan motive means moving one of said platforms over the entire length of said path;

the other of said scan motive means moving the other of said platforms over a fractional part of said path;

motion control means for controlling said first and second scan motive means.

7. The scanning apparatus of claim 6 wherein said zoom/focus motive means includes a zoom/focus stepper motor; and focus control means coupled to said camera means.

8. The scanning apparatus of claim 7 wherein said focus control means includes first and second lead screws, and first and second guide shafts; with said lead screws coupled to said zoom/focus stepper motor by a non-slip belt.

9. The scanning apparatus of claim 7 wherein said scan motive means and said zoom/focus motive means operate together to produce said computer image under control of digital electronics.

10. The scanning apparatus of claim 6 wherein said scan motive means and said zoom/focus motive means operate together to produce said computer image under control of digital electronics.

11. A scanning apparatus for producing a digital image of a two dimensional original object for use in a computer comprising:

first and second platform means each adapted for moving along a predetermined path covering said original object;

means for moving said first and second platform means separately along said predetermined path, so that a distance moved by said second platform means is less than a distance moved by said first platform means;

said first platform means being adapted to support camera means with precision zoom and focus means for receiving light reflected from said original object to produce an image in a predetermined digital format;

said second platform means being adapted to support said original object for movement along said predetermined path;

whereby the combined motions of said first and second platform means provides a high resolution digital image of said original object.

* * * * *